United States Patent
Wandschura et al.

(10) Patent No.: US 10,141,857 B2
(45) Date of Patent: Nov. 27, 2018

(54) ENERGY SUPPLY DEVICE FOR SUPPLYING ELECTRIC ENERGY AND METHOD OF OPERATING A CORRESPONDING ENERGY SUPPLY DEVICE

(71) Applicant: JENOPTIK Power Systems GmbH, Altenstadt (DE)

(72) Inventors: Michael Wandschura, Schongau (DE); Michael Hobler, Schongau (DE)

(73) Assignee: JENOPTIK Power Systems GmbH, Altenstadt (DE)

( * ) Notice: Subject to any disclaimer, the term of this patent is extended or adjusted under 35 U.S.C. 154(b) by 0 days.

(21) Appl. No.: 15/410,888

(22) Filed: Jan. 20, 2017

(65) Prior Publication Data

US 2018/0212529 A1    Jul. 26, 2018

(51) Int. Cl.
| H02M 5/40 | (2006.01) |
| H02J 7/00 | (2006.01) |
| H02J 7/34 | (2006.01) |
| H02M 3/00 | (2006.01) |

(52) U.S. Cl.
CPC .............. *H02M 5/40* (2013.01); *H02J 7/007* (2013.01); *H02J 7/0013* (2013.01); *H02J 7/345* (2013.01); *H02M 3/00* (2013.01)

(58) Field of Classification Search
CPC ................................. H02J 7/345; H02M 5/40
USPC ................. 320/140, 167; 323/288; 361/271; 363/35, 65, 95
See application file for complete search history.

(56) References Cited

U.S. PATENT DOCUMENTS

| 5,504,668 A * | 4/1996 | Beyerlein ........... H02M 3/3376 363/132 |
| 7,474,879 B2 * | 1/2009 | Turner .................... H02J 7/345 307/109 |
| 8,013,555 B2 * | 9/2011 | Thornell-Pers ......... H02P 13/06 318/432 |
| 2007/0182362 A1 * | 8/2007 | Trainor .................. H01M 10/46 320/101 |
| 2008/0123225 A1 * | 5/2008 | Matsubara .............. H02M 1/32 361/15 |
| 2011/0260683 A1 * | 10/2011 | Fujii ....................... H02J 7/045 320/109 |
| 2012/0293137 A1 * | 11/2012 | Sone ..................... B60L 11/005 320/166 |
| 2013/0038249 A1 * | 2/2013 | Tabatabaei ................ B60L 1/20 318/3 |
| 2014/0177299 A1 * | 6/2014 | Wang ...................... H02J 3/382 363/65 |
| 2014/0183939 A1 * | 7/2014 | Jiang .................. B60L 11/1853 307/9.1 |
| 2015/0213709 A1 * | 7/2015 | Miller ....................... H02J 7/35 340/693.2 |

* cited by examiner

*Primary Examiner* — Gary Nash
(74) *Attorney, Agent, or Firm* — Muncy, Geissler, Olds & Lowe, P.C.

(57) ABSTRACT

An energy supply device for providing electric energy, wherein the energy supply device has at least one input interface for receiving electric energy and an output interface for outputting electric energy, and wherein at least one supercapacitor is connected between the input interface and the output interface.

15 Claims, 1 Drawing Sheet

ENERGY SUPPLY DEVICE FOR SUPPLYING ELECTRIC ENERGY AND METHOD OF OPERATING A CORRESPONDING ENERGY SUPPLY DEVICE

BACKGROUND OF THE INVENTION

Field of the Invention

The present invention relates to an energy supply device for supplying electric energy and to a method of operating a corresponding energy supply device.

Description of the Background Art

For providing electronic energy, often a peak power, i.e. a multiple of the nominal power of an energy source, such as a generator, is required by a power unit for a limited period of time. In order to be able to generate such peak power by means of a conventional diesel power unit, for example, a diesel engine used an energy source had to be significantly over-dimensioned, i.e. designed for peak power. This has led to using, as an energy source, a very expensive power unit the peak power of which only in a fraction of its operation time. Thus, more expensive redundancy of the required power range for such a power unit is to be held available. Alternatively, a way of energy supply could also be provided by an additional energy storage as centrifugal mass storage or as accumulators, which would mean limited mobility, however, i.e. such an energy supply device would be very heavy and therefore no longer portable. In addition, over-dimensioning of such current supply equipment would still be observed.

SUMMARY OF THE INVENTION

It is therefore an object of the present invention to provide a way of providing and operating an inexpensive energy supply device usable in flexible operational environments.

In an exemplary embodiment, the present invention provides an energy supply device for providing electric energy, wherein the energy supply device comprises at least one input interface for receiving electric energy and an output interface for outputting electric energy, and wherein at least one supercapacitor is connected between the input interface and the output interface in an manner.

Here, a supercapacitor may be defined to be an electrochemical capacitor, for example. In this context, the effects of static storage of electric energy by means of a separation of charge in Helmholtz double layers in a double layer capacitor, for example, and/or electrochemical storage of electric energy by way of Faraday charge transfer by means of a redox reaction in a pseudo-capacitor can be utilized.

Such an embodiment of the approach presented herein is based on the finding that using a supercapacitor both can be employed in a technologically easy way to store large amounts of energy or power and requires little space for storing such a large amount of energy, so that it becomes possible to employ such an energy supply device in a mobile or portable apparatus, for example. Hereby, it becomes possible to build up, in the supercapacitor, an energy or power reserve taken from the at least one supercapacitor in case a power peak of the energy to be output by the energy supply device occurs. To this end, the at least one supercapacitor may, for example, be connected in parallel to the input interface and/or the output interface. Alternatively or additionally, the input interface and/or the output interface may also be electrically connected to each other, wherein a first terminal of the at least one supercapacitor is connected to both the input interface and the output interface and a second terminal of the at least one supercapacitor is connected to both the input interface and the output interface, for example.

According to an embodiment, the at least one supercapacitor may be designed as a double layer capacitor, a pseudo-capacitor and/or a hybrid capacitor. Using a supercapacitor of such design allows for particularly efficient storage of electric energy or power while consuming little space and/or weight. Moreover, supercapacitors of such design are sophisticated and available at low cost.

Furthermore, in an embodiment, the at least one supercapacitor may be designed as a lithium ion capacitor. Such an embodiment offers the advantage of using a particularly widely available and very efficient technology for storing electric energy or power.

What is also feasible is an embodiment of the approach presented here wherein there is provided at least a further supercapacitor connected between the input interface and the output interface, wherein the at least one further supercapacitor is connected in parallel to the supercapacitor, in particular. Such an embodiment of the approach presented herein offers the advantage of an inexpensive solution for a large amount of electric energy or power to be buffered, because using two supercapacitors instead of one supercapacitor having correspondingly larger energy absorption capacity may save costs and space at equal electrical characteristics.

What is also advantageous is an embodiment of the approach presented here wherein a DC-to-DC converter (DC=direct current) is connected between the supercapacitor and the input interface, and/or that an inverter is connected between the at least one supercapacitor and the output interface. Such an embodiment of the approach presented herein offers the advantage of flexibility for the energy source to be connected to the input interface with respect to the electric energy provided by this energy source. For example, what may also be used in this case is an energy source providing direct voltage which cannot be fed into the at least one supercapacitor directly without causing damage of the supercapacitor.

According to an embodiment of the approach presented herein, a rectifier may be connected between the DC-to-DC converter and the input interface or between the input interface and the at least one supercapacitor, and/or a transformer may be connected between the inverter and the output interface. Such an embodiment of the approach presented herein offers the advantage that the energy supply device may also be employed for a scenario providing an alternating voltage at the input interface and/or requiring an alternating voltage at the output interface, so that the versatility of such an energy supply device is increased. It is also possible for an alternating voltage to be input at the input interface and a direct voltage to be output at the output interface or a direct voltage to be input at the input interface and an alternating voltage to be output at the output interface, so that the energy supply device can be used advantageously as a corresponding voltage adapting device or impedance bridging device in such a case.

What is technologically particularly advantageous is an embodiment of the approach presented here wherein the at least one supercapacitor is connected to a control circuit for controlling and/or regulating charging the at least one supercapacitor with electric energy or power, wherein the control circuit is configured to read in a measured value concerning a physical parameter of the at least one supercapacitor and to control and/or regulate energy input via the input interface and/or energy output via the output interface in response to the at least one measured value, in particular. Such an embodiment offers the advantage that charging and/or discharging of the supercapacitor may be monitored and/or controlled or regulated so that the life of the supercapacitor may be prolonged by efficient operation of this supercapacitor. Furthermore, by means of a corresponding charge program, it may be ensured that the supercapacitor is recharged with electric energy as soon as possible after energy has been taken therefrom.

What is technologically particularly advantageous is an embodiment of the approach presented here wherein the energy supply device is designed as a portable device. Herewith an usability of the energy supply device is further more enhanced In a particularly advantageous embodiment of the approach presented herein, there is presented an energy supply system comprising an energy supply device in accordance with an embodiment described herein and an energy source connected or connectable to the input interface of the energy supply device in an electrically conducting manner.

What is also presented is a method of operating an energy supply device in accordance with an embodiment described here, wherein the method comprises at least the steps of: inputting electric energy into the supercapacitor via the input interface of the energy supply device; and outputting electric energy from the supercapacitor via the output interface.

The advantages of the approach presented here may also be realized efficiently and inexpensively by executing such a method.

What is also conceivable is an embodiment of the approach presented here in form of a controller configured to execute and/or control steps of the method in accordance with an embodiment presented here in corresponding units of a device. Thereby, the previously mentioned advantages may also be realized efficiently and inexpensively.

To this end, the controller may comprise at least one arithmetic unit for processing signals or data, at least one storage unit for storing signals or data, at least one interface to a sensor or an actor for reading sensor signals from the sensor or for outputting control signals to the actor and/or at least one communication interface for reading or outputting data embedded in a communication protocol. The arithmetic unit may, for example, be a signal processor, a microcontroller or the like, wherein the storage unit may be a flash memory, an EEPROM or a magnetic storage unit. The communication interface may be configured to read or output data via a line and/or in a wireless manner, wherein a communication interface capable of reading or outputting data via a line may, for example, read or output this data electrically or optically from or into a corresponding data transmission line, respectively.

What is also advantageous is a computer program product or computer program having program code which may be stored on a machine-readable carrier or storage medium, such as a semiconductor memory, a hard disk storage, or an optical memory and used for performing, realizing and/or controlling the steps of the method in accordance with one of the previously described embodiments, particularly when the program product or program is executed on a computer or a device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
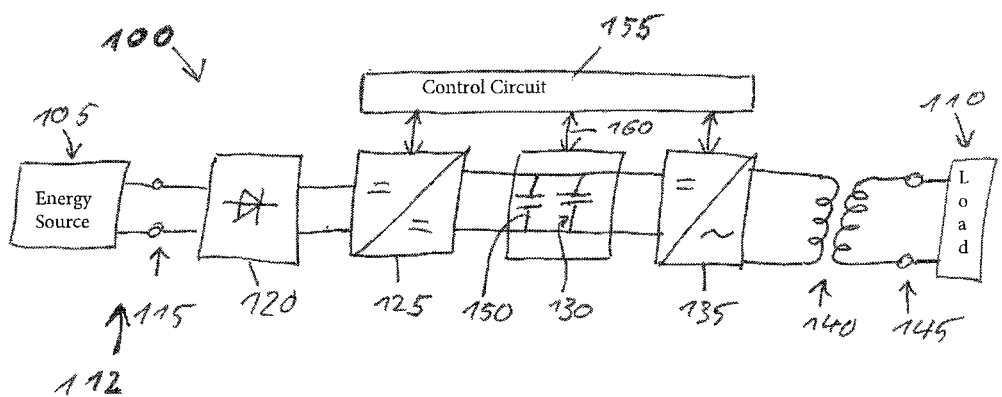
FIG. 1 shows a block diagram of an embodiment of the present invention an energy supply device.

FIG. 1 shows a block diagram of an embodiment of the present invention as an energy supply device 100. Such an embodiment of an energy supply device 100 may be used for peak power supply in directed energy applications. The energy supply device 100, according to the embodiment illustrated in FIG. 1, opens the possibility to receive energy from an energy source 105 which is designed as an engine-driven generator, particularly as a combustion engine or Diesel engine driven generator, for example. Alternatively or additionally, the energy source 105 may also comprise energy storage such as an accumulator or rechargeable battery, a renewable energy source such as a photo-voltaic module, a fuel cell or the like. The energy source 105 is designed to output a predetermined peak power which mostly is lower than a peak power rarely required by a load 110 to be connected to the energy supply device 100, for example an electric motor. To this end, the energy supply device 100 is provided with further components so as to enable a booster function for short-time increase in power output to the load 110. The combination of the energy supply device 100 and the energy source 105 may be referred to as energy supply system 112.

In order to realize this increase in power output or energy output to the load 110, according to the embodiment illustrated in FIG. 1, the energy source 105 is connected to an input interface 115 of the energy supply device 100 in an electrically conducting manner so as to transfer electric energy from the energy source 105 to further components of the energy supply device 100. This input interface 115 may, for example, comprise a pair of terminals or further components. From the input interface 115, the electric energy taken up then is fed to a rectifier 120, for example. The rectifier 120 is configured to transfer electric energy with direct voltage or with a voltage without change of sign from electric energy received in alternating voltage at the input interface 115, for example. However, use of the rectifier 120 is optional and is particularly advantageous when the electric energy provided by the energy source 105 has a different voltage characteristic from the voltage required by the load 110. According to the embodiment of an energy supply device 100 illustrated in FIG. 1, the rectifier 120 passes the electric energy, which now comprises a rectified voltage, on to a DC-to-DC converter 125 (DC=direct current; which may alternatively or additionally also function as a direct-voltage-to-direct-voltage converter or may synonymously be referred to as such) transforming a direct voltage of the electric energy output by the rectifier 120 to a voltage required for charging a supercapacitor 130, for example.

In to the embodiment illustrated in FIG. 1, the supercapacitor 130 is connected to both the DC-to-DC converter 125 and to an inverter 135. Hereby, the supercapacitor 130 acts as an energy buffer which is charged when power input from the DC-to-DC converter 125 is higher than power output to the inverter 135 and may output electric power and thus implement a booster function in the case of a charged state when required power output to the inverter 135 is increased relative to power input by the DC-to-DC converter 125.

The inverter 135 according to the embodiment depicted in FIG. 1 further is connected, via a transformer 140, to an output interface 145 via which electric energy is output to the load 110, for example. For example, the transformer 140 is provided here so as to realize galvanic isolation between components of the energy supply device 100 and the load 110 and thereby be able to bridge different levels of potential in the energy supply device 100 and the load 110. Alternatively or additionally, transformation of a voltage output by the inverter 135 to a voltage output at the output interface 145 may also be done by the transformer 140 in order to equalize the voltage output at the output interface 145 with a voltage required by the load 110. In this context, it is to be noted that the rectifier 120, the DC-to-DC converter 125 and the inverter 135 are optional components of the energy supply device 100, which can be used depending on the application scenario.

Moreover, it is advantageous if at least one further supercapacitor 150 is connected in parallel to the supercapacitor 130. Thereby, store capacity or capacitance of the supercapacitor 130 can be increased by technologically simple, inexpensive and space-saving means, because the distribution of the store capacity to two or more supercapacitors, such as the further supercapacitor 150, may be done in a small space otherwise not usable, for example, or supercapacitors with smaller store capacities may be manufactured in an inexpensive way. Furthermore, it is also possible to connect other supercapacitors not illustrated in FIG. 1, in addition to the further supercapacitor 150, in parallel to the supercapacitor 130 and the further supercapacitor 150, thereby again increasing the store capacity of these supercapacitors further.

In this context, use of energy storage in the form of a supercapacitor (a so-called supercap), such as the supercapacitor 130 or the further supercapacitor 150, offers several advantages compared to conventional technologies, such as centrifugal mass storage or an accumulator or a battery. In this context, it is to be noted specifically that a supercapacitor is considerably more lightweight, at a given power storage capacity, than flywheel storage, for example. Thereby, it advantageously becomes possible to also design the energy storage device 100 shown in FIG. 1 as a block diagram as a portable or mobile device, resulting in significant in increase in possible applications for such an energy storage device 100. This behavior particularly is due to high power density of the supercapacitors and hence lower weight compared to the prior art. Moreover, such a solution can do without movable functional parts. In addition, significantly improved charging performance of the energy storage can be achieved as an approach according to the prior art when using supercapacitors, because such energy storage charge more quickly at greater charge capacity. As a side effect, the approach described here has better performance at low temperatures, which particularly allows for less vulnerability to weather and thus for improved possible applications outdoors, especially in winter. Also, more load cycles are possible compared to an approach using accumulators.

Specifically, a supercapacitor can be understood to be electrochemical energy storage. Herein, one or more supercapacitors from several families of supercapacitors may be used for the approach proposed here, such as supercapacitors from the following families of capacitors: double layer capacitors comprising carbon electrodes or derivatives thereof with a very high double layer capacitance. The proportion of the Faraday pseudo-capacitance with respect to the overall capacitance is only small; pseudo-capacitors having electrodes of metal oxides or conductive polymers and a very high and proportion of Faraday pseudo-capacitance; and hybrid capacitors having asymmetrical electrodes, one having high double layer capacitance, the second one having high pseudo-capacitance. Lithium ion capacitors also are counted among the hybrid capacitors.

Thus, the energy storage or supercapacitor may also be realized advantageously by lithium ion capacitors.

What is particularly advantageous is an embodiment of the approach presented here wherein there is provided a control circuit 155 which monitors or controls or regulates charging or discharging of the at least one supercapacitor 130. To this end, the control circuit 155 may sense or read in a measured value 160 as a characteristic parameter of the at least one supercapacitor 130 and/or of the further supercapacitor 150, for example a temperature or a supercharging rate thereof, and control or regulate the DC-to-DC converter 125 and/or the inverter 135 correspondingly in response to this characteristic parameter, in order to monitor or control or regulate power supply to the supercapacitor 130 and/or the further supercapacitor 150 and/or power output from the supercapacitor 130 and/or the further supercapacitor 150 to the inverter 135. Thereby, the life of the supercapacitor 130 and/or the further supercapacitor 150 may be prolonged and/or it may be ensured that the supercapacitor 130 and/or the further supercapacitor 150 remain in a discharged or partly discharged state only as briefly as possible. The energy supply device 100 thus advantageously comprises a control circuit 155 in form of specially developed power electronics for intelligent charging/discharging of the supercapacitor 130 respectively the further supercapacitor 150.

Figure 2:
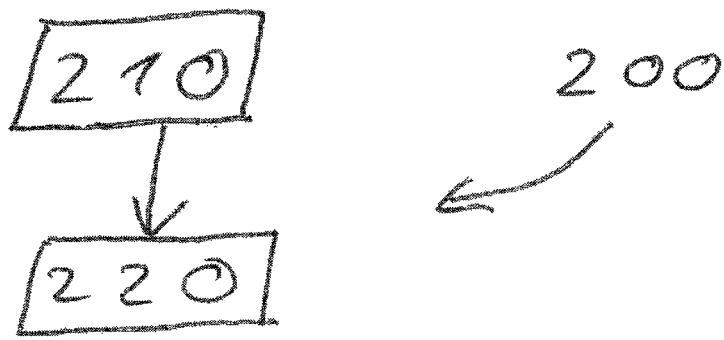
FIG. 2 shows a flowchart of an embodiment of the present invention as a method of operating an energy supply device.

FIG. 2 shows a flowchart of an embodiment of the approach presented here as a method 200 of operating an embodiment of an energy supply device 100 as described herein. The method 200 comprises a step 210 of inputting electric energy into the supercapacitor via the input interface of the energy supply device and a step 220 of outputting electric energy from the supercapacitor via the output interface.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An energy supply device for providing electric energy, the energy supply device comprising:
   at least one input interface for receiving electric energy;
   an output interface for outputting electric energy; and
   at least one supercapacitor connected between the input interface and the output interface, wherein the at least one supercapacitor is connected to a control circuit for controlling and/or regulating charging the at least one supercapacitor with electric energy, and wherein the control circuit is configured to read in a measured value relating to a physical parameter of the at least one supercapacitor and to control and/or regulate energy input via the input interface and/or energy output via the output interface in response to the at least one measured value.

2. The energy supply device according to claim 1, wherein the at least one supercapacitor is a double layer capacitor, a pseudo-capacitor and/or a hybrid capacitor.

3. The energy supply device according to claim 1, wherein the at least one supercapacitor is a lithium ion capacitor.

4. The energy supply device according to claim 1, wherein at least one further supercapacitor connected between the input interface and the output interface, and wherein the at least one further supercapacitor is connected in parallel to the supercapacitor.

5. The energy supply device according to claim 1, wherein a DC-to-DC converter is connected between the at least one supercapacitor and the input interface and/or between the input interface and the at least one supercapacitor, and/or wherein an inverter is connected between the at least one supercapacitor and the output interface.

6. The energy supply device according to claim 5, wherein a rectifier is connected between the DC-to-DC converter and the input interface, and/or that a transformer is connected between the inverter and the output interface.

7. The energy supply device according to claim 1, wherein the energy supply device is a portable device.

8. An energy supply system comprising:
the energy supply device according to claim 1; and
an energy source connected or connectable to the input interface of the energy supply device in an electrically conducting manner.

9. A method of operating an energy supply device according to claim 1, wherein the method comprises:
inputting electric energy into the at least one supercapacitor via the input interface of the energy supply device; and
outputting electric energy from the at least one supercapacitor via the output interface.

10. A controller configured to execute and/or control the method according to claim 9 in corresponding units.

11. A computer program configured to execute and/or control steps of the method according to claim 9.

12. The energy supply device according to claim 1, wherein the energy supply device is adapted to receive energy from an energy source, the energy source comprising a combustion engine or a diesel engine driven generator.

13. The energy supply device according to claim 1, further comprising:
a DC-to-DC converter connected between the at least one supercapacitor and the input interface; and
an inverter connected between the at least one supercapacitor and the output interface.

14. The energy supply device according to claim 1, further comprising a transformer connected to the output interface.

15. A system, comprising:
an energy source, the energy source comprising a combustion engine or a diesel engine driven generator;
an energy supply device adapted to receive energy from the energy source, the energy supply device comprising:
an input interface for receiving electric energy;
an output interface for outputting electric energy; and
a supercapacitor connected between the input interface and the output interface; and
a load connected to the energy supply device,
wherein the supercapacitor is connected to a control circuit for controlling and/or regulating charging the supercapacitor with electric energy, and
wherein the control circuit is configured to read in a measured value relating to a physical parameter of the supercapacitor and to control and/or regulate energy input via the input interface and/or energy output via the output interface in response to the measured value.

* * * * *